July 18, 1944.    F. S. EVES ET AL    2,353,884
LIQUID PRESSURE REMOTE CONTROL SYSTEM
Original Filed April 21, 1941    2 Sheets-Sheet 1

INVENTORS
FREDERICK S. EVES, &
ALFRED C. BAMFORD, deceased,
BY GERTRUDE M. D. BAMFORD &
DENBY C. BAMFORD, Administrators By Stevens and Davis
ATTYS.

July 18, 1944. F. S. EVES ET AL 2,353,884
LIQUID PRESSURE REMOTE CONTROL SYSTEM
Original Filed April 21, 1941   2 Sheets-Sheet 2
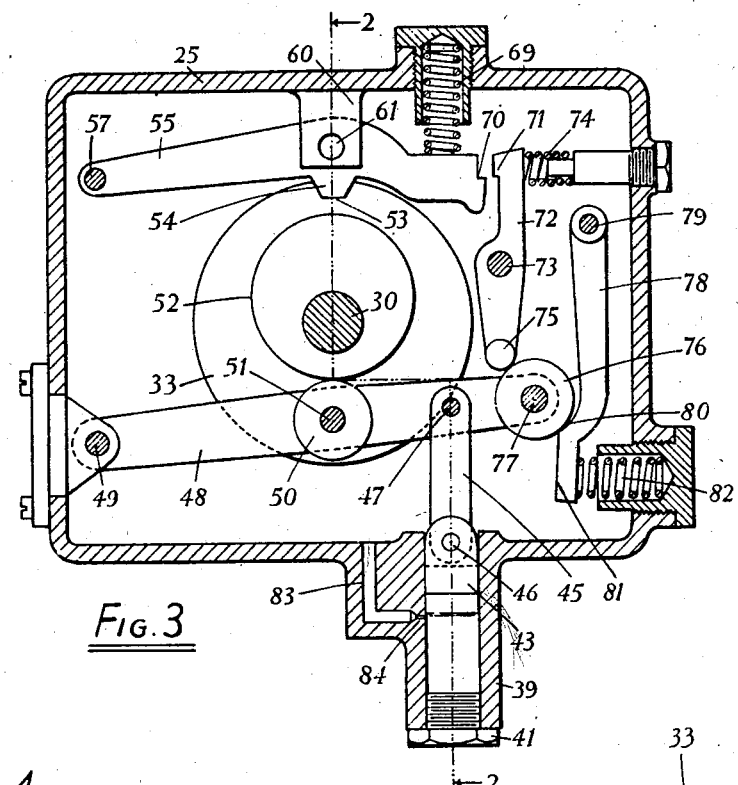
Fig.3
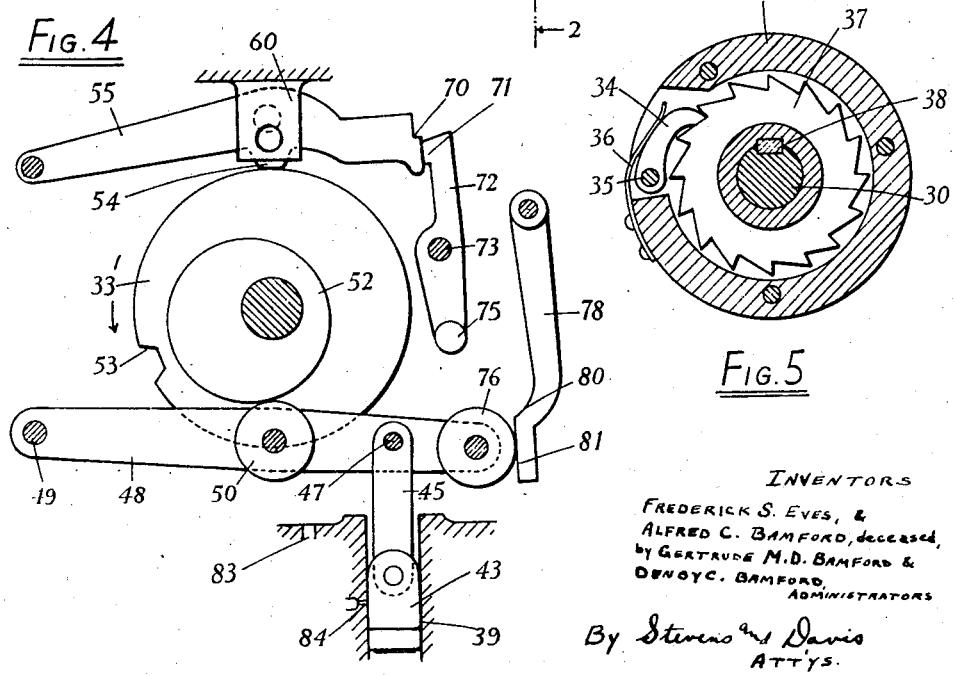
Fig.4
Fig.5
INVENTORS
FREDERICK S. EVES, &
ALFRED C. BAMFORD, deceased,
by GERTRUDE M.D. BAMFORD &
DENOY C. BAMFORD,
                 ADMINISTRATORS
By Stevens and Davis
            ATT'YS.

Patented July 18, 1944

2,353,884

UNITED STATES PATENT OFFICE 2,353,884

LIQUID PRESSURE REMOTE-CONTROL SYSTEM

Frederick Sydney Eves, Leamington Spa, England, and Alfred Chadburn Bamford, deceased, late of Liverpool, England, by Gertrude Mary Dalgety Bamford and Denby Chadburn Bamford, administrators, Hoylake, England, assignors to Automotive Products Company, Limited, Leamington Spa, England, a British company, and Chadburn's (Ship) Telegraph Company Limited, Bootle, Liverpool, England, a British company, jointly Original application April 21, 1941, Serial No. 389,674, now Patent No. 2,335,269, dated November 30, 1943. Divided and this application September 18, 1942, Serial No. 458,884. In Great Britain April 29, 1940

8 Claims. (Cl. 60—54.6)

This invention relates to liquid pressure remote control systems, and it has for its primary object to provide an improved form and construction of system in which means are incorporated to ensure that the slave unit or units of the system are operated in accordance with movements imparted to the transmitter pump or like master unit of the system.

This application is a division of application Serial No. 389,674, filed April 21, 1941, now Patent No. 2,335,269.

The invention has particular utility in connection with the order telegraph devices such as are used on ships for the purpose of transmitting instructions, say from the bridge to the engine room. It is, therefore, a further object of the invention to provide a robust and efficient order telegraph system which is operated hydraulically.

A further object of the invention is to provide means for ensuring that the operated member, for example the distant pointer of a ship's telegraph, is moved accurately to any one of a plurality of predetermined positions, irrespective of any slight inaccuracies which there may be in the transmitting mechanism, due for instance to the use of long lengths of pipeline or to rough usage of the system.

In a liquid pressure remote control system having a transmitter pump arranged to bring about reciprocation of one or more motor units, according to one feature of the invention, locking means are provided in the transmitter pump and come into action automatically at a predetermined stage to prevent further operation of said transmitter pump until such time as said locking means are released by the motor unit or units.

Further, a liquid pressure remote control system is provided in which a transmitter unit comprises a pair of cylinder and piston devices operated by a spindle, wherein means responsive to the direction in which the spindle is rotated are arranged to connect operatively one or other of the cylinder and piston devices to the spindle, depending upon the direction in which the said spindle is rotated, the unconnected device remaining inoperative all the time that said rotation is continued.

The invention further provides for a liquid pressure remote control system, a transmitter pump comprising a pair of cylinders, pistons slidable in said cylinders, a rotary actuating spindle, and selective drive transmitting means whereby one only of the pistons is moved relative to its cylinder when the spindle is rotated clockwise, and the other of said pistons is alone moved relative to its cylinder when the spindle is rotated anti-clockwise.

The invention is illustrated by way of example in the accompanying diagrammatic drawings, in which—

Figure 3 is a sectional elevation of the transmitter pump taken on the line 3—3 of Figure 2;

Figure 4 is a fragmentary view corresponding to Figure 3 but showing the internal parts in different positions; and Figure 5 is a sectional elevation of one of the transmitter ratchet devices, the section being taken on the line 5—5 of Figure 2.

Figure 1:
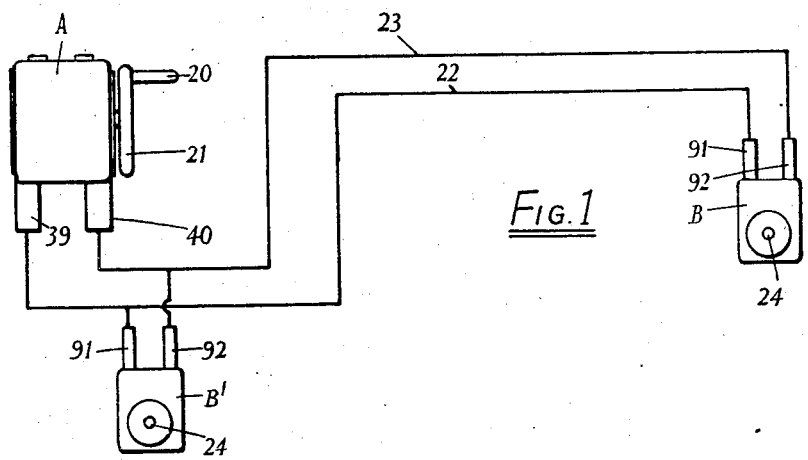
Figure 1 shows a simple form of remote indicating system.

The liquid pressure remote control system which is shown in Figure 1 comprises a transmitter unit A which is provided with an operating handle 20 and wheel 21 and is connected by a pair of pipe lines 22 and 23 with a pair of motor units B and B', said motor units being arranged in parallel across the pipe lines 22 and 23. Each is provided with a spindle 24, which is arranged to move angularly in steps, one step for each complete rotation of the wheel 21 of the transmitter unit A, the construction of the motor units being described more fully in our copending application Serial No. 389,674, filed April 21, 1941.

The transmitter unit A comprises a substantially rectangular casing 25 having end plates 26 and 27 carrying bearings 28 and 29 for an operating shaft or spindle 30, to which latter the wheel 21 (Figure 1) is secured. Within the casing 25 the shaft 30 carries a pair of ratchet devices indicated generally at 31 and 32, each of said devices comprising a substantially cylindrical drum member 33 which is freely rotatable upon the shaft 30, and which carries a pawl 34 (see Figure 5). This pawl is accommodated within a cut-away portion of the drum member 33 and is pivotally mounted upon a pin 35, a leaf spring 36 being arranged to urge said pawl 34 inwards into engagement with a ratchet wheel 37 secured non-rotatably upon the shaft 30 by means of a key 38.

The ratchet devices 31 and 32 are arranged to transmit a drive in opposite directions, so that when the shaft 30 is turned in a clockwise direction (as viewed from the righthand end of said shaft) the drum member 33 of the ratchet device 31 is rotated, but the drum member of the ratchet device 32 remains stationary. Conversely, when the shaft is rotated in an anti-clockwise direction, the ratchet device 32 is driven, while the ratchet device 31 slips.

Figure 2:
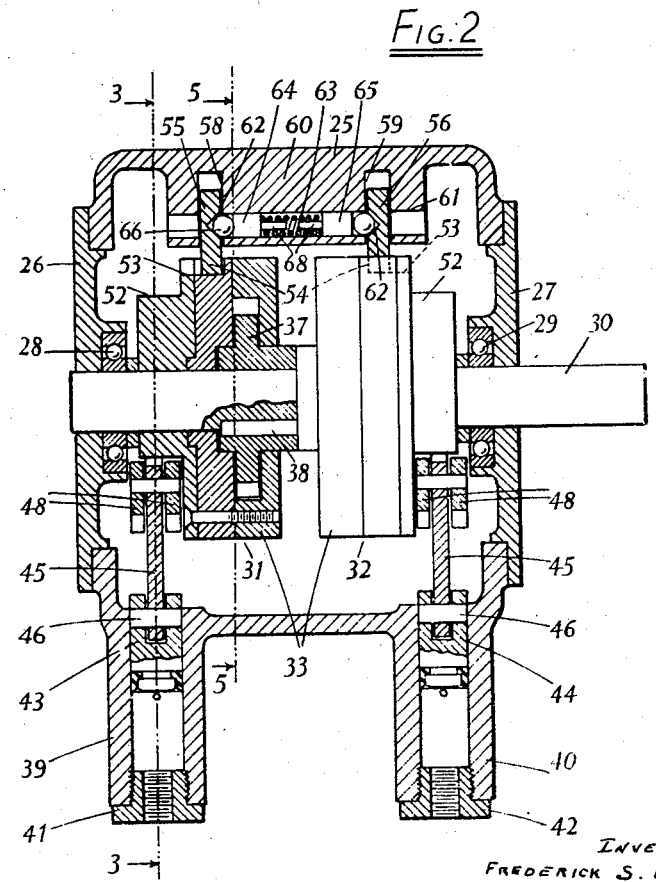
Figure 2 is a sectional elevation drawn to an enlarged scale to show the internal construction of the transmitter pump, the section being taken on the line 2—2 of Figure 3.

The bottom of the casing 25 is formed with a pair of cylinders 39 and 40, which are provided with screw plugs 41 and 42 for connection to the pipe lines 22 and 23 respectively (see Figure 1). Pistons 43 and 44 are slidable within the cylinders 39 and 40, each of said pistons being connected pivotally with a corresponding link 45 by means of a pin 46. The upper end of the link 45 is pivotally connected at 47 with a follower lever 48, which latter conveniently comprises a pair of bars arranged side by side, as seen in Figure 2. The follower lever 48 is pivotally anchored to the casing 25 by means of a pin 49 and at a position approximately half-way along its length it carries a freely rotatable follower roller 50 mounted upon a pin 51. This roller is adapted to engage with an eccentric cam 52, which is secured to or forms part of the corresponding drum member 33, so that as the latter rotates, downward force is imparted to the follower lever 48 during every alternate half revolution of the drum member 33. This downward movement is, of course, imparted to the corresponding piston 43, and it will thus be seen that when the shaft 30 is rotated clockwise the piston 43 is operated, whereas anti-clockwise rotation of the shaft 30 actuates the piston 44.

As each complete revolution of the shaft 30 corresponds with one step of movement of the motor units B and B', locking means are provided for preventing the direction of rotation of the shaft 30 from being reversed except when said shaft is in a predetermined zero position, for example with the handle 20 uppermost. For this purpose each of the drum members 33 is formed at one place in its periphery with a substantially trapezoidal recess 53, which is adapted to be engaged by a correspondingly shaped projection 54 formed upon the underneath of a locking lever. The locking lever for the ratchet device 31 is indicated at 55, while the locking lever for the ratchet device 32 is shown at 56, each being pivoted to the casing 25 at 57. The sloping surfaces of the recess 53 and projection 54 are arranged so that the projection rides out of the recess as the corresponding drum member 33 rotates, although, of course, when the locking lever 55 or 56 is held down, the rotation of the drum member 33 is positively prevented. The locking levers 55 and 56 pass through substantially rectangular notches 58 and 59 in a thickened web member 60 formed in the top of the casing 25, said web member having a longitudinal bore 61 intersecting both of the notches 58 and 59. On their inwardly facing sides the locking levers 55 and 56 have conical recesses 62, which register with the bore 61 when the projections 54 are fully engaged with the recesses 53. A spring 63 disposed within the bore 61 serves to urge apart a pair of cylindrical thrust pieces 64 and 65, which in turn urge a pair of balls 66 and 67 into engagement with the conical recesses 62. Axial projections 68 formed upon the thrust pieces 64 and 65 are adapted to butt against one another, thus limiting the extent to which the thrust pieces 64 and 65 can approach one another. The distance separating the spigots 68 when the parts are disposed in the positions shown in Figure 2, with both of the locking levers 55 and 56 in their lowered and operative positions, is arranged to be sufficient for allowing only one of the balls 66 or 67 to be ejected from its recess 62. Thus either of the locking levers 55 and 56 can be raised, but when one is raised the other is positively locked in its down position, the parts 64, 65, 66, 67 and 68 constituting an axially continuous thrust member which prevents the other ball 66 or 67 from moving out of its recess 62.

The shaft 30 is shown in its zero position in Figures 2 and 3, and it will be seen that it can be rotated in either direction, the parts resuming their original positions when one complete revolution has taken place. Supposing, however, that the shaft 30 has been rotated through part of a revolution with, say, the ratchet device 31 driving, and an attempt is made to reverse the direction of rotation, the drive will be transferred from the ratchet device 31 to the ratchet device 32, the drum member 33 of which latter is, of course, prevented from rotating, as its locking lever 56 is being positively held down by the ball 67. Therefore reverse rotation cannot take place and it is necessary for the movement of the shaft 30 to proceed in uni-directional units, each composed of one complete revolution. The locking levers 55 and 56 are each urged towards their operative positions by a coiled compression spring 69.

Auxiliary locking means are provided for arresting the movement of the shaft 30 whenever it reaches its zero position should the piston 43 (or 44) which is being operated not have reached its fully raised position. It should be mentioned that the pistons 43 and 44, in being moved downwardly by the corresponding eccentric cam 52, force liquid into the motor units B and B' against the force exerted by springs as will be hereinafter explained, so that when the piston 43 (or 44) is free to rise, liquid is expelled from the motor units B and B' at a moderate pressure and thus raises said piston as far as is permitted by the eccentric cam 52. Separate locking means are provided for the respective ratchet devices 31 and 32, said means being similar in construction and being shown in Figures 3 and 4. The end of the locking lever 55 (or 56) is formed with a step 70 which is adapted to be engaged by a projection 71 formed at the top of a catch lever 72, which is pivoted to the casing 25 at 73, and is urged resiliently towards the locking lever by a coiled compression spring 74. At its lower end, the catch lever 72 is formed with a pin 75, which is adapted to co-operate with a roller 76 pivotally mounted upon a pin 77 at the free end of the follower lever 48. A restoring arm 78, pivoted to the casing 25 at 79, has at its lower part a cam surface composed of two portions indicated at 80 and 81 respectively. The restoring arm 78 is urged towards the roller 76 by a coiled compression spring 82 and when the piston 43 is at or adjacent its uppermost position, the roller 76 engages with the cam surface 80, which is obliquely disposed so that the force of the spring 82 is utilised to raise the piston 43 (or 44) through the last portion of its upward travel, and to retain it and the follower lever 48 in their fully raised positions, so long as the corresponding drum member 33 is in its zero position, as shown in Figure 3. It will be noted that with the parts iin this position the roller 76 engages the pin 75, and thus deflects the catch lever 72, so that the catch projection 71 is held out of engagement with the step 70 of the locking lever.

The cam surface 8 is arranged so as to lie substantially parallel with the direction in which the roller 76 moves as the piston 43 (or 44) proceeds downwards within its cylinder, so that the spring 82 then exerts no force at all tending to move the follower lever about its pivot 49. This is clear from Figure 4, which indicates the position of the parts when the drum member 33 of the ratchet device 31 has been turned in the direction of the arrow, the recess 53 having reached the position shown. It will be seen that the roller 76 has left the pin 75 of the catch lever 72, so that the upper end of the latter bears against the locking lever 55, said locking lever, of course, being in its raised position. As the drum member 33 continues to turn, the piston 43 is moved to the bottom of its stroke and then as the drum member 33 proceeds with the second half of its revolution, the piston 43 is forced upwardly by the liquid which is returned at moderate pressure from the motor units B and B'. This action is not, of course, assisted by either the eccentric cam 52 or the cam surface 81 of the restoring arm 78; if, therefore, the piston 43 lags in relation to the eccentric cam 52, the catch lever 72 remains operative when the recess 53 is next engaged by the projection 54 of the locking lever, and the catch projection 71 consequently engages with the step 70, said projection thus positively holding the drum member 33 against further rotation in either direction until such time as the piston 43 has reached its fully raised position. When this happens the roller 76 re-engages with the pin 75 and releases the catch projection 71 from the step 70.

The interior of the casing 25 is used as a storage reservoir for spare working liquid and it is connected by a passage 83 with a small orifice 84 leading into the cylinder 39 (or 40) at a position which is below the lower edge of the piston 43 (or 44) when the latter is fully raised. The cam surface 80 is arranged to take charge of the piston just before the orifice 84 is uncovered so that the piston and follower lever 48 are raised, and remain in their raised positions, despite the fact that the interior of the cylinder 39 (or 40) is connected with the reservoir so as to allow the pipe line 22 (or 23) to breathe in the known manner. When the piston 43 (or 44) moves downwardly, the orifice 84 is closed at the very first part of the stroke and thereafter liquid pressure is created in the cylinder.

The transmitter described is, of course, given merely as an example and various modifications in the construction may be made without departing from the invention.

What we claim is:

1. In a liquid pressure remote control system, a piston and cylinder unit, a rotatable spindle, means responsive to a complete revolution of said spindle for displacing said piston to a fixed extent, a disc on said spindle, said disc having a recess therein, means engageable in said recess upon completion of each revolution thereof to lock the spindle against further movement, and means responsive to the return of the piston to starting position for disengaging the means from the recess to free the spindle.

2. In a liquid pressure remote control system, a transmitter pump comprising a pair of piston and cylinder units, a driving spindle, a pair of ratchet and pawl devices mounted on said spindle so that one transmits a rotary drive in only one direction and the other only in the other direction, and a pair of cam and follower devices driven respectively by the ratchet devices each to reciprocate the corresponding piston relative to its cylinder, the driving spindle being capable of making a plurality of complete revolutions in sequence in the same direction for repeatedly reciprocating that piston which corresponds to the direction of rotation of the spindle.

3. In a liquid pressure remote control system, a transmitter pump comprising a pair of piston and cylinder units, a driving spindle, a pair of ratchet and pawl devices mounted on said spindle so that one transmits a rotary drive in only one direction and the other only in the other direction, a pair of cam and follower devices driven respectively by the ratchet devices each to advance the corresponding piston within its cylinder, and means for returning each piston as the cam presents a surface of decreasing radius to the follower, the driving spindle being capable of making a plurality of complete revolutions in sequence in the same direction for repeatedly reciprocating that piston which corresponds to the direction of rotation of the spindle.

4. In a liquid pressure remote control system, a transmitter pump comprising a pair of piston and cylinder units, a driving spindle, a pair of ratchet and pawl devices, each comprising a driving member and a driven member, mounted on and actuated by said spindle so that one transmits a rotary drive in only one direction and the other only in the other direction, reciprocating means connecting the ratchet devices with the respective pistons, and means for locking the driven member of one of the ratchet and pawl devices when the spindle is turned in a direction appropriate to actuate the other ratchet and pawl device, whereby the spindle is prevented from being reversed in rotation until such time as said locking means is released.

5. A liquid pressure remote control system as claimed in claim 4, wherein the locking means are actuated by rotation of one ratchet and pawl device and serve to prevent rotation of the other ratchet and pawl device.

6. In a liquid pressure remote control system, a transmitter pump comprising a pair of piston and cylinder units, a driving spindle, a pair of ratchet and pawl devices, each comprising a driving member and a driven member, mounted on and actuated by said spindle so that one transmits a rotary drive in only one direction, and the other only in the other direction, reciprocating means connecting the ratchet devices with the respective pistons, means for locking the driven member of one of the ratchet and pawl devices when the spindle is turned in a direction appropriate to actuate the other ratchet and pawl device, whereby the spindle is prevented from being reversed in rotation until such time as said locking means is released, auxiliary locking means arranged to hold both ratchet devices locked when the spindle reaches a predetermined zero position, and means which are actuated by the corresponding piston and which release the auxiliary locking means as the piston assumes its fully returned position.

7. In a liquid pressure remote control system, a transmitter pump comprising a pair of piston and cylinder units, a rotatable driving spindle for operating said units one full cycle of reciprocation per revolution, means responsive to the direction of rotation of said spindle for selectively actuating one or the other of said units, a ratchet mechanism connected with the spindle, locking means associated with said ratchet mechanism to prevent rotation of the spindle in one direction, and means responsive to rotation of the spindle in the opposite direction for bringing said locking means into action and thereby preventing the rotation of said spindle from being reversed.

8. A liquid pressure remote control system as claimed in claim 7, including means for releasing the locking means each time the spindle reaches a predetermined zero position, thereby allowing the direction of rotation to be reversed only at that position.

FREDERICK SYDNEY EVES.
G. M. D. BAMFORD,
D. C. BAMFORD,
*Administrators of the Estate of Alfred Chadburn Bamford, Deceased.*